US007180910B2

(12) United States Patent
Kim et al.

(10) Patent No.: US 7,180,910 B2
(45) Date of Patent: Feb. 20, 2007

(54) METHOD FOR DYNAMICALLY ALLOCATING BANDWIDTH IN ATM PASSIVE OPTICAL NETWORK

(75) Inventors: Seung Hwan Kim, Daejon (KR); Yu Tae Lee, Pusan (KR); Je Soo Ko, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1043 days.

(21) Appl. No.: 10/251,130

(22) Filed: Sep. 20, 2002

(65) Prior Publication Data

US 2003/0123482 A1 Jul. 3, 2003

(30) Foreign Application Priority Data

Dec. 27, 2001 (KR) ................ 2001-85751

(51) Int. Cl.
*H04J 3/16* (2006.01)
(52) U.S. Cl. ................ 370/468; 370/477; 370/395.21
(58) Field of Classification Search ................ 370/465, 370/468, 477, 395.21, 395.1
See application file for complete search history.

(56) References Cited

U.S. PATENT DOCUMENTS 6,636,527 B1 * 10/2003 Lee et al. ................ 370/465
6,721,504 B2 * 4/2004 Kim et al. ................ 398/58
6,728,248 B1 * 4/2004 Uchida et al. ........... 370/395.1

FOREIGN PATENT DOCUMENTS

KR 1999-0070901 9/1999

OTHER PUBLICATIONS

Dynamic Bandwidth Assignment for ATM-PON Systems by N. Shimada et al.; 3.4-1-3.7-7, Apr. 2001.
DBA Function for Broadband Passive Opitcal Network Systems by M. Yoshino et al. pp. 3.1-1-3.1-8, 2001.

* cited by examiner

*Primary Examiner*—Doris H. To
*Assistant Examiner*—Steve Blount
(74) *Attorney, Agent, or Firm*—Blakely Sokoloff Taylor & Zafman

(57) ABSTRACT

The present invention relates to a method for dynamically allocating bandwidth under a media access control (MAC) protocol between an optical line termination (OLT) and a group including a plurality of optical network units (ONUs) in an ATM-PON. In order to meet quality of service (QoS) requirement, the dynamic bandwidth allocation method is capable of determining bandwidth to be allocated to each of the ONUs on the basis of information about traffic indicators of connections established to each of the ONUs and about the number of non-real time cells waiting in each of the ONUs, resulting in an enhancement in utilization efficiency of an upstream transmission channel and enabling an effective transmission.

13 Claims, 6 Drawing Sheets

METHOD FOR DYNAMICALLY ALLOCATING BANDWIDTH IN ATM PASSIVE OPTICAL NETWORK

BACKGROUND OF THE INVENTION

1. Field of the Invention

The present invention relates to a method for dynamically allocating bandwidth in an asynchronous transfer mode—passive optical network (ATM-PON), which enables effective use of network resources and provision of various ATM services under a media access control (MAC) protocol between an optical line termination (OLT) and an optical network unit (ONU) group including a plurality of ONUs in the ATM-PON.

2. Description of the Related Art

Currently, an ATM-PON system has been set and operated as an economic network establishment technology suitable for provision of broadband services. The ATM-PON system, which is an access network, makes use of an upstream traffic multiplexing. In order to effectively perform the multiplexing function, it is necessary to introduce a MAC protocol to the ATM-PON system. In many MAC protocol proposals, a tree algorithm is proposed as an algorithm for collision resolution. On the other hand, the tree algorithm may suffer degradation in its performance if time-sensitive high-priority traffic is received.

In general, a broadband PON system is employed by a number of network providers. This broadband PON system provides services at various rates from low-speed to high-speed, which services may be low-speed synchronization services such as voice services or high-speed services such as local area network (LAN) interconnection services. Therefore, it is required that bandwidth allocation based on the MAC protocol does not cause service performance degradation.

The PON system employs an optical distribution network (ODN) which is an distribution network between ONUs and a Fiber To the Home (FTTH) or Fiber To the Office (FTTC) subscriber access nodes. All nodes in the PON system are configured using a bus or tree topology.

The PON system includes the ONUs and an OLT in order to access an optical access network. The ONUs are installed in homes or office buildings, respectively. The OLT is installed in a central office and connected to each of the ONUs through an optical cable. The PON service can provide through the OLT various services including an Internet service, a plain old telephone service (POTS), a video on demand (VOD) service and the like.

In the PON system, exchange equipment and optical resources can be shared by users, and the optical distribution network is passive. Therefore, the PON system is advantageous in that its maintenance cost is low, and it is possible to easily add or delete a split due to its highly flexible structure. Further, the PON system provides a very efficient resource sharing, so that the users can be provided with various services at low costs.

However, because a number of users share the optical resources in the PON system, there may occur collision between the users. The collision is caused often under ATM-PON environments supporting multimedia traffic environments, resulting in a degradation in performance.

As a result, there is a need for a method capable of transmitting information without collision between users and effectively using network resources in the PON system.

SUMMARY OF THE INVENTION

Therefore, the present invention has been made in view of the above problems, and it is an object of the present invention to provide a method for dynamically allocating bandwidth in an asynchronous transfer mode, or ATM, passive optical network (ATM PON), which allows an optical line termination (OLT) to determine bandwidth to be allocated to optical network units (ONUs) in an ONU group on the basis of information about traffic indicators of connections established to each of the ONUs and about the number of non real-time cells waiting in each of the ONUs so as to meet a required quality of service (QoS).

In accordance with the present invention, the above and other objects can be accomplished by the provision of method for dynamically allocating bandwidth in an ATM PON for data exchange between an OLT and an ONU group including a plurality of ONUs, the method comprising the steps of: a) setting a fixed bandwidths, effective bandwidths, assured bandwidths, maximum bandwidths and dynamic bandwidths as traffic indicators of the connections established to each of the ONUs; b) comparing a sum of fixed bandwidths of all the ONUs with an available link capacity; c) allocating bandwidth to each of the ONUs proportionally to the effective bandwidths of the corresponding ONUs, if the sum of the fixed bandwidths of all the ONUs is larger than the available link capacity; d) allocating bandwidth to the all ONUs by the fixed bandwidths and comparing a sum of maximum bandwidths of all the ONUs with the available link capacity, if the sum of the fixed bandwidths of all the ONUs is not larger than the available link capacity; and e) additionally allocating remaining bandwidth to the ONUs proportionally to the dynamic bandwidths, if the sum of the maximum bandwidths is larger than the available link capacity, and allocating bandwidth to each of the ONUs such that the entire bandwidths to be allocated to each of the ONUs is equal to the maximum bandwidths and equally allocating remaining bandwidth to the ONUs by the same amount, if the sum of the maximum bandwidths is not larger than the available link capacity.

Preferably, the fixed bandwidth is set to a sum of peak cell rates (PCRs) of all real-time connections established to each of the ONUs; the effective bandwidth is set to a sum of peak cell rates (PCRs) of all constant bit rate (CBR) connections and sustainable cell rates (SCRs) of all real-time variable bit rate (rtVBR) connections, the CBR and rtVBR connections being established to each of the ONUs; the maximum bandwidth is set to a sum of PCRs of all connections established to each of the ONUs; and the assured bandwidth is set to a sum of a sum of minimum cell rates (MCRs) of all available bit rate (ABR) connections and a sum of sustainable cell rates (SCRs) of all non real-time variable bit rate (nrtVBR) connections, the ABR and nrtVBR connections being established to each of the ONUs.

Preferably, the step c) comprises the steps of c-1) allocating bandwidth to the ONUs proportionally to the effective bandwidth; c-2) allocating bandwidth to the ONU as much as the fixed bandwidth, if bandwidth to be allocated to an ONU of the ONU group exceeds a fixed bandwidth set for the ONU; c-3) allocating bandwidth as much as a difference of the bandwidth to be allocated to the ONU and the fixed bandwidth to the ONUs proportionally to the effective bandwidth; and c-4) returning to the step c-1) if the entire bandwidth is not allocated.

Preferably, the step e) comprises the steps of e-1) additionally allocating bandwidth to the ONUs such that the entire bandwidth to be allocated to each of the ONUs is equal to the maximum bandwidth, if the sum of the maximum bandwidths is not larger than the available link capacity; and e-2) equally allocating bandwidth remaining after the additional allocation to the ONUs by the same amount.

Preferably, the step e) further comprises the steps of e-1) additionally allocating bandwidth remaining after the bandwidth allocation at the step d) to the ONUs proportionally to the dynamic bandwidth, if the sum of the maximum bandwidths is larger than the available link capacity; e-2) allocating bandwidth to an ONU of the ONU group as much as the maximum bandwidth thereof if the entire bandwidth to be allocated to the ONU exceeds the maximum bandwidth thereof; e-3) equally allocating bandwidth remaining after the bandwidth allocation to the ONU to the other ONUs by the same amount, whereby, the step b) and c) is repeatedly performed until the entire bandwidth is allocated to all the ONUs.

Preferably, the dynamic bandwidth allocation method further comprises the step of f) updating the fixed bandwidths, the effective bandwidths, the maximum bandwidths and the assured bandwidths of an ONU of the ONU group when a new real-time connection is established to the ONU or when an existing real-time connection is released from the ONU, and updating the dynamic bandwidth of the ONU under the condition that the dynamic bandwidth is initially set to the same value as the assured bandwidth when a new non real-time connection is established thereto or when an existing non real-time connection is released, whereby, the steps b) to e) are performed after updating the traffic indicators at the step f).

More preferably, the step f) comprises the steps of f-1) determining to which ONU the real-time connection has been established, if the new real-time connection is established; is a CBR connection or a rtVBR connection; f-3) updating the fixed bandwidth, the effective bandwidth and the maximum bandwidth of the corresponding ONU by adding a PCR of the new established real-time connection to each of them, if the established real-time connection is the CBR connection; and f-4) updating the fixed bandwidth, the effective bandwidth and the maximum bandwidth of the corresponding ONU by adding the PCR to each of the fixed and maximum bandwidths and by adding an SCR to the effective bandwidth of the new established realtime connection, if the established real-time connection is the rtVBR connection.

More preferably, if the existing new real-time connection is released at the step f), the step f) comprises the steps of: f-1) determining from which ONU the real-time connection has been released; f-2) determining whether the released real-time connection is a CBR connection or a rtVBR connection; f-3) subtracting a PCR of the released real-time connection from each of the fixed bandwidths, the effective bandwidths and the maximum bandwidths of the corresponding ONU, if the released real-time connection is the CBR connection; and f-4) subtracting the PCR from each of the fixed and maximum bandwidths of the corresponding ONU and subtracting an SCR of the released real-time connection from the effective bandwidth of the ONU, if the released real-time connection is the rtVBR connection.

More preferably, the step f) comprises the steps of f-1) determining to which ONU the non real-time connection has been established, if the new non real-time connection is established; f-2) determining whether the established non real-time connection is a nrtVBR connection, an ABR connection or a unspecified bit rate (UBR) connection; f-3) adding a PCR of the non real-time connection to the maximum bandwidth of the corresponding ONU, adding an SCR of the non real-time connection to the assured bandwidth of the ONU and adding the SCR to the dynamic bandwidth of the ONU, if the established non real-time connection is the nrtVBR connection; f-4) adding a minimum cell rate (MCR) of the non real-time connection to the assured bandwidth and adding the MCR to the dynamic bandwidth, if the established non real-time connection is the ABR connection, adding the PCR to the maximum bandwidth; and f-5) adding the PCR to the maximum bandwidth, if the established non real-time connection is the UBR connection.

More preferably, the step f) comprises the steps of f-1) determining from which ONU the non real-time connection has been released, if the existing non real-time connection is released; f-2) determining whether the released non real-time connection is a nrtVBR connection, an ABR connection or a UBR connection; f-3) subtracting a PCR of the non real-time connection from the maximum bandwidth of the corresponding ONU, subtracting an SCR of the non real-time connection from the assured bandwidth of the ONU and subtracting the SCR from the dynamic bandwidth of the ONU, if the released non realtime connection is the nrtVBR connection; f-4) subtracting the PCR from the maximum bandwidth, subtracting an MCR of the non real-time connection from the assured bandwidth and subtracting the MCR from the dynamic bandwidth, if the released non real-time connection is the ABR connection; and f-5) subtracting the PCR from the maximum bandwidth, if the released non real-time connection is the UBR connection.

More preferably, the step f) includes the steps of f-1) determining which ONU sends the state information, if a state information is received from any one of the ONUs using a mini-slot; f-2) comparing a length of a queue contained in the mini-slot with a value of 'dynamic bandwidth×frame length' of the corresponding ONU; f-3) calculating (the queue length−the 'dynamic bandwidth×frame length')/(a 'mini-slot reception period×frame length')+(the dynamic bandwidth of the ONU), if the queue length is larger than the value of 'dynamic bandwidth×frame length'; and f-4) calculating (the dynamic bandwidth-(the 'dynamic bandwidth×frame length'-the queue length))/(a frame length), if the queue length is not larger than the value of 'dynamic bandwidth×frame length'.

As described above, the present invention concerns a method for dynamically allocating bandwidth in the ATM PON for data exchange between the OLT and the ONU group including a plurality of ONUs. In this invention, each of the fixed bandwidths, the effective bandwidths, the maximum bandwidths, the assured bandwidth and the dynamic bandwidths is set as traffic indicators of connections established to each of the ONUs.

The fixed bandwidth of an ONU is defined by a sum of PCRs of all real-time connections established to the ONU. The effective bandwidth of the ONU is defined by a sum of PCRs of all CBR connections established to the ONU and SCRs of all rtVBR connections established to the ONU. The maximum bandwidth is defined by a sum of PCRs of all connections established to the ONU. The assured bandwidth is defined by a sum of SCRs of all nrtVBR connections established to the ONU and MCRs of all ABR connections established to the ONU.

The dynamic bandwidth allocation method according to the present invention is capable of appropriately updating the traffic indicators (or the fixed bandwidths, the effective bandwidths, the maximum bandwidths and the assured bandwidths) such that they are used in dynamic bandwidth allocation, before dynamically allocating bandwidth in the ATM PON for data exchange between the OLT and the ONU group including a plurality of ONUs.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
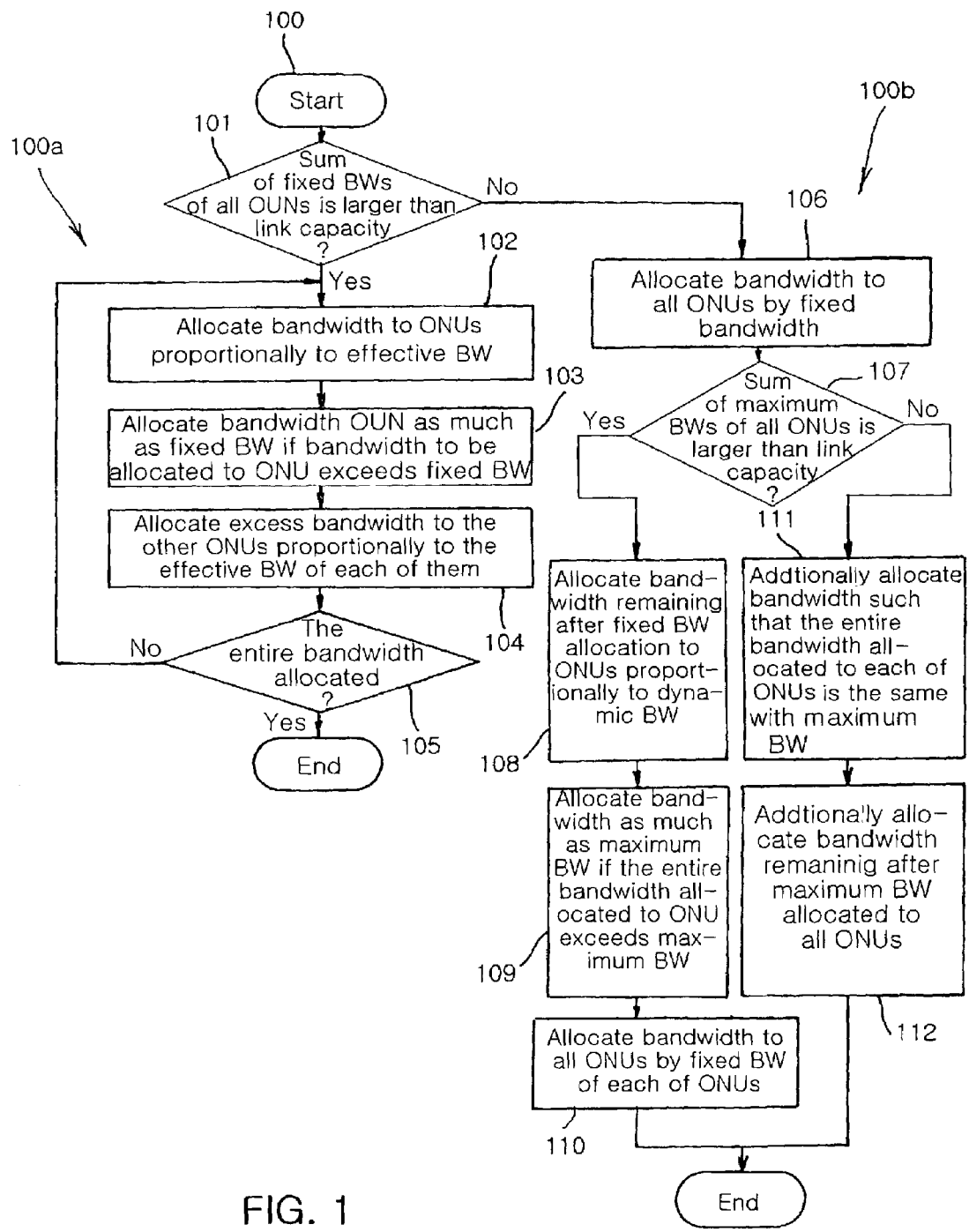
FIG. 1 is a flow chart illustrating a procedure of performing a dynamic bandwidth allocation in an asynchronous transfer mode, or ATM, passive optical network (ATM-PON) according to the present invention.

FIG. 1 is a flow chart illustrating a procedure of performing dynamic bandwidth allocation in an asynchronous transfer mode—passive optical network (ATM-PON) according to the present invention. With reference to this drawing, a description will be given of the dynamic bandwidth allocation according to the present invention below.

First, at an initial step before allocation, the sum of fixed bandwidths (BWs) of all ONUs is compared with a link capacity (S101).

The bandwidth allocation is performed in different manners according to whether the sum of the fixed BWs is larger than the link capacity (S100a), or not (S100b).

If it is determined at step 101 that the sum of the fixed BWs is larger than the link capacity, bandwidth is allocated to the ONUs proportionally to an effective BW of each of the ONUs (S102). Where the bandwidth to be allocated to an ONU of the ONU group exceeds a fixed BW of the corresponding ONU, the ONU is allocated bandwidth as much as its fixed BW (S103), and then bandwidth corresponding the difference between the entire bandwidth to be allocated the ONU and the fixed BW is allocated to the other ONUs proportionally to the effective BW of each of them (S104). At step 105, it is determined that the entire bandwidth is allocated to the ONUs. If it is determined at step 105 that the entire bandwidth has not been allocated to the ONUs, the steps 102 to 104 are repeatedly performed until the entire bandwidth are allocated.

On the other hand, if it is determined at step 101 that the sum of the fixed BWs is not larger than the link capacity, bandwidth is allocated to the ONUs by a fixed BW of each of the ONUs (S106). Then, the sum of maximum BWs of the ONUs is compared with the link capacity (S107). If it is determined at step 107 that the sum of maximum BWs is larger that the link capacity, bandwidth, which remains after bandwidth allocation at step 106, is allocated to the ONUs proportionally to a dynamic BW of each of the ONUs (S108). If the bandwidth allocated to an ONU of the ONU group exceeds a maximum BW of the ONU, additional allocation to the ONU is controlled such that the entire BW to be allocated to the ONU is equal to the maximum BW (S109). Bandwidth remaining after additional bandwidth allocation is equally allocated to the ONUs (S110) by the same amount. Steps 108 to 110 are repeatedly performed until the entire bandwidth is allocated to the entire ONUs.

On the other hand, if it is determined at step 107 that the sum of maximum BWs is not larger that the link capacity, the each of the ONUs is additionally allocated bandwidth such that the entire bandwidth to be allocated to the corresponding ONU is equal to the maximum bandwidth of the ONU (S111). Then, bandwidth remaining after this additional allocation to the ONU is equally allocated to the ONUs by the same amount (S117).

Figure 2:
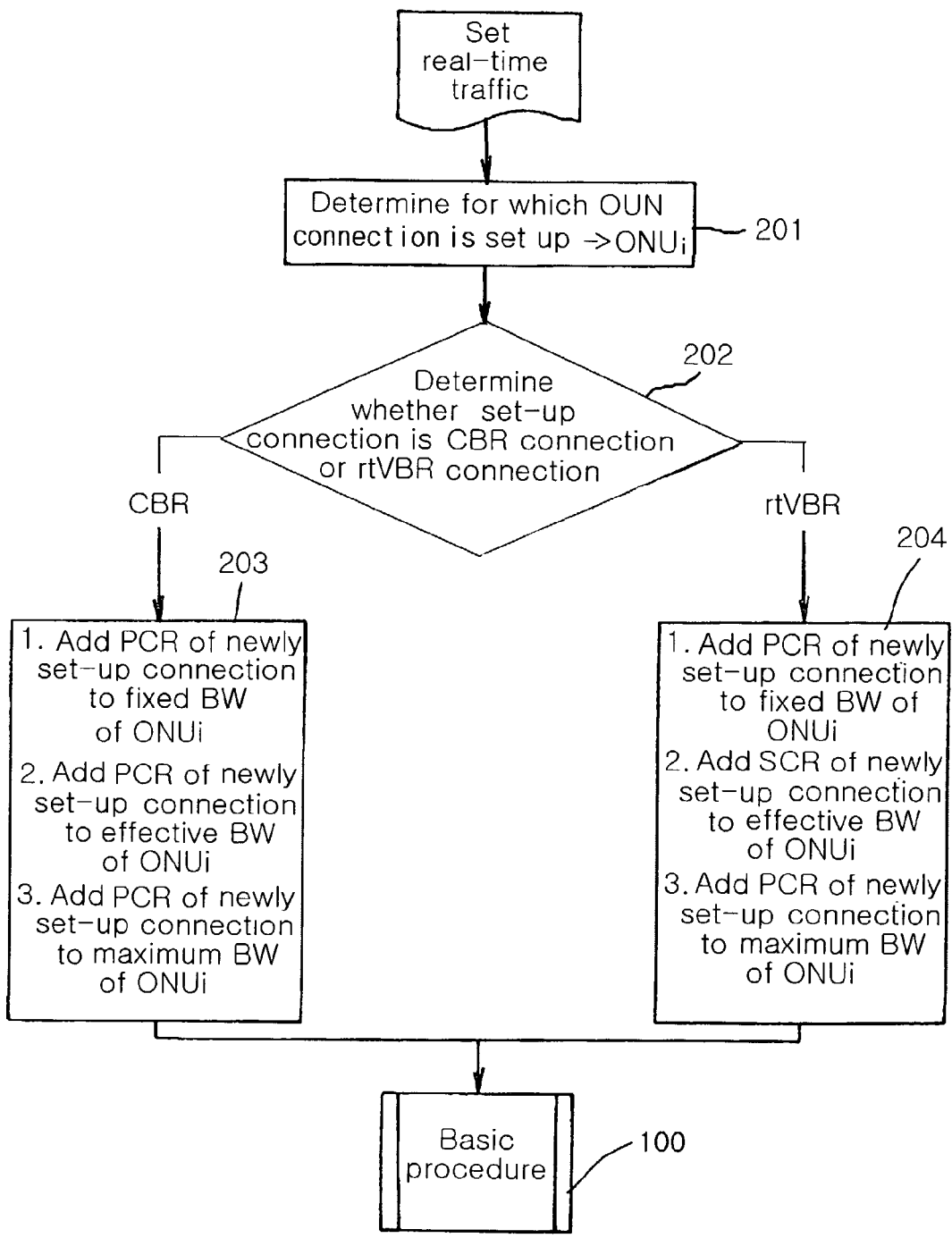
FIG. 2 is a flow chart illustrating a procedure of performing a pre-processing necessary before the dynamic bandwidth allocation according to the present invention, when a new real-time connection is set up.

In the dynamic bandwidth allocation according to the present invention, in the case where a new real-time connection is set up, a pre-processing of FIG. 2 is performed before the basic allocation process described above with reference to the FIG. 1.

FIG. 2 is a flow chart illustrating a procedure of performing the pre-processing according to the present invention when the new real-time connection is set up. Once the real-time connection is set up, then it is determined for which ONU the real-time connection is set up (S201). An ONU associated with the real-time connection setup is called an ONUi.

Thereafter, it is determined whether the real-time connection is a constant bit rate (CBR) connection or a real-time variable bit rate (rtVBR) connection (S202).

Traffic indicators for the connection setup associated with the corresponding ONUi are updated according to whether the connection is a CBR connection or a rtVBR connection (S203 and S204).

A more detailed description will be given of steps 203 and 204. If it is determined at step 202 that a new CBR connection is set up, the traffic indicators for the CBR connection are updated in such a manner as to add a peak cell rate (PCR) of the newly set-up connection to a fixed BW, effective BW and maximum BW of the ONUi.

Alternatively, if it is determined at step 202 that a new rtVBR connection is set up, the traffic indicators for the rtVBR connection are updated in such a manner as to add the peak cell rate (PCR) of the newly set-up connection to the fixed BW and maximum BW of the ONUi, and to add the effective BW of the ONUi to a sustainable cell rate (SCR) of the rtVBR connection.

After updating the traffic indicators for the connection newly set up in the above manner, the dynamic bandwidth allocation is performed (S100) in the same manner as described above with reference to FIG. 1.

Figure 3:
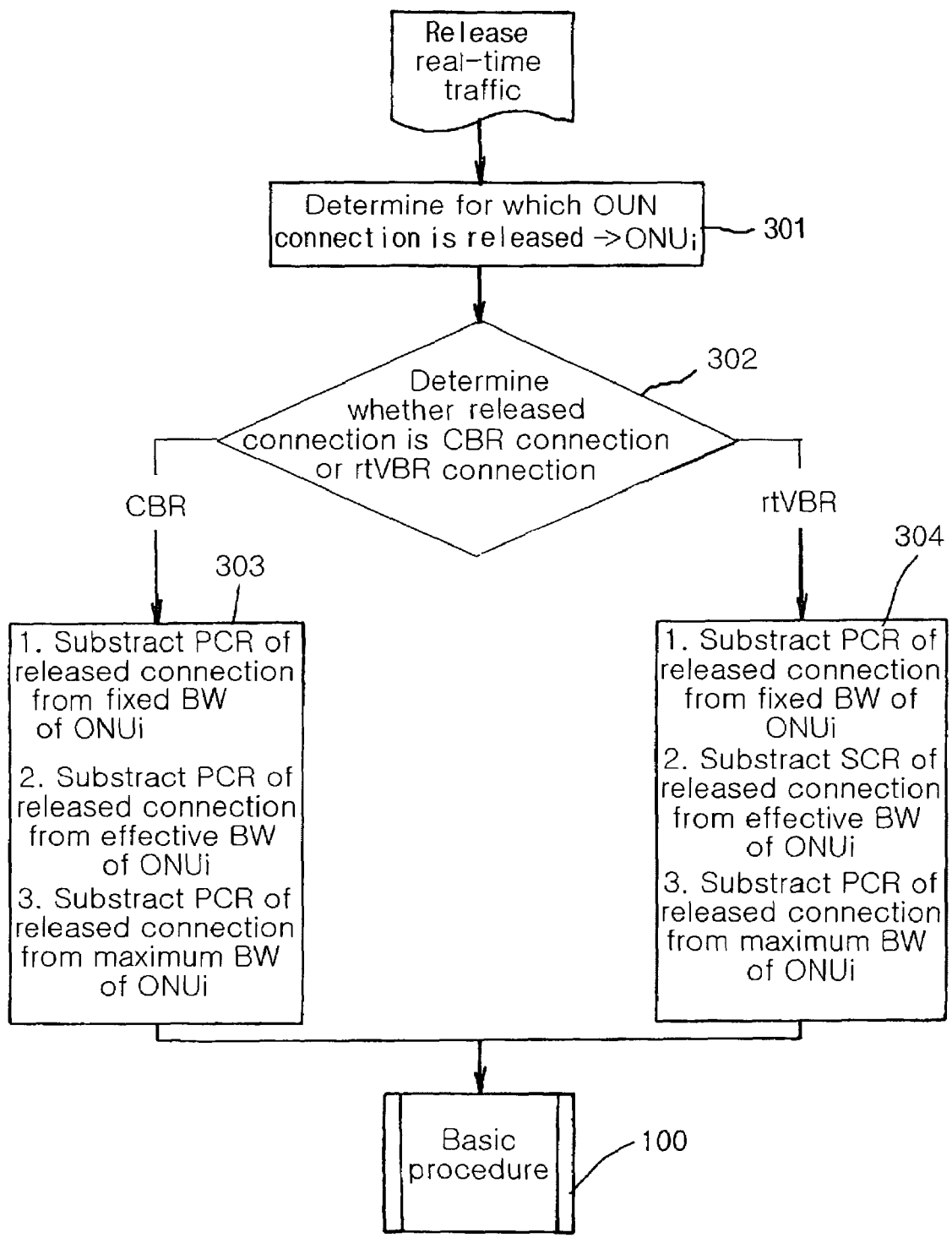
FIG. 3 is a flow chart illustrating a procedure of performing a pre-processing necessary before the dynamic bandwidth allocation according to the present invention, when an existing new real-time connection is released.

FIG. 3 is a flow chart illustrating a procedure of performing a pre-processing necessary before the dynamic bandwidth allocation, when an existing new real-time connection is released in the ATM-PON to which the present invention is applied.

As shown in this drawing, if the real-time connection is released in the ATM-PON, then it is determined with which ONU the real-time connection release is associated (S301). An ONU associated with the real-time connection release is called an ONUi.

Thereafter, it is determined whether the released connection is a constant bit rate (CBR) connection or real-time variable bit rate (rtVBR) connection (S302). Traffic indicators for the released connection associated with the ONUi are updated in different manners. A more detailed description will be given of the traffic indicator update. If it is determined at step 302 that the released connection is a CBR connection, the traffic indicators for the CBR connection are updated in such a manner as to subtract a peak cell rate (PCR) of the released connection from a fixed BW, effective BW and maximum BW of the ONUi (S303). Alternatively, if it is determined at step 302 that the released connection is a rtVBR connection, the traffic indicators for the rtVBR connection are updated by subtracting the peak cell rate (PCR) of the released connection from the fixed BW and maximum BW of the ONUi, and by subtracting a sustainable cell rate (SCR) of the released connection from the effective BW of the ONUi.

In the present invention, if the existing real-time connection is released, after updating the traffic indicators for the released connection in the above manner, the dynamic bandwidth allocation is performed (S100) in the same manner as described above with reference to FIG. 1.

Figure 4:
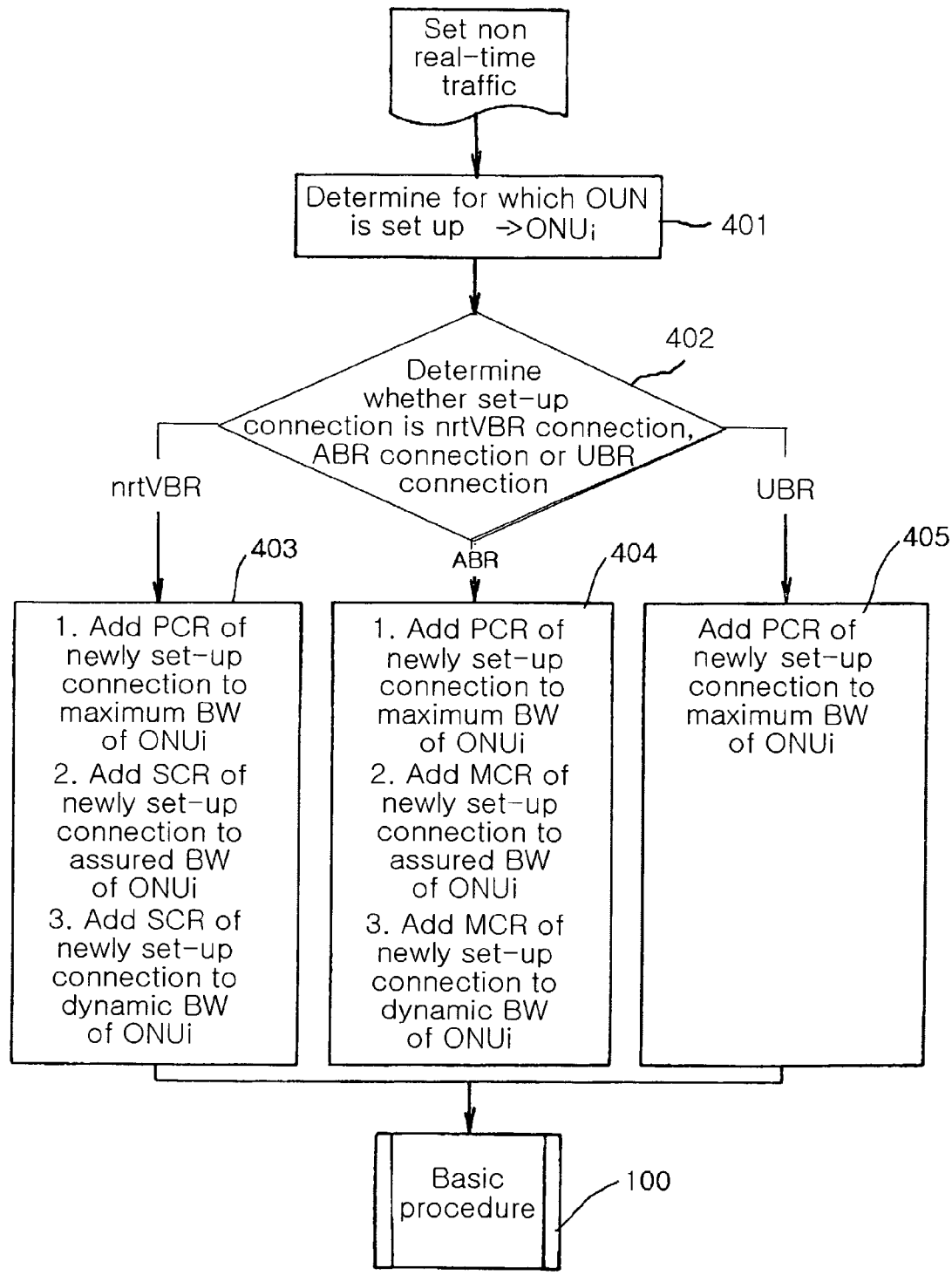
FIG. 4 is a flow chart illustrating a procedure of performing a pre-processing necessary before the dynamic bandwidth allocation according to the present invention, when a new non real-time connection is set up.

FIG. 4 is a flow chart illustrating a procedure of performing a pre-processing necessary before the dynamic bandwidth allocation, when a new non real-time connection is set up in the dynamic bandwidth allocation method according to the present invention.

With reference to FIG. 4, once a non real-time connection is set up, then it is determined for which ONU the non real-time connection is set up (S401). An ONU associated with the non real-time connection is called an ONUi.

Thereafter, it is determined whether the set-up connection is a non real-time variable bit rate (nrtVBR) connection, available bit rate (ABR) connection or unspecified bit rate (UBR) connection (S402). Traffic indicators for the set-up connection associated with the ONUi is updated in different manners. A more detailed description will be given of the traffic indicator update.

If it is determined at step 402 that the set-up connection is a nrtVBR connection, the traffic indicators for the nrtVBR connection are updated in such a manner as to add a PCR of the set-up connection to a maximum BW of the ONUi and to add an SCR of the set-up connection to assured and dynamic BWs of the ONUi (S403).

Alternatively, if it is determined at step 402 that the set-up connection is an ABR connection, the traffic indicators for the ABR connection are updated in such a manner as to add the PCR to the maximum BW and to add a minimum cell rate (MCR) of the set-up connection to the assured BW and dynamic BW (S404).

On the other hand, if it is determined at step 402 that the set-up connection is an UBR connection, the traffic indicators for the UBR connection are updated by adding the PCR to the maximum BW (S405).

After updating the traffic indicators for the real-time connection for the ONUi according to a service class of the connection, the dynamic bandwidth allocation is performed (S100) in the same manner as described above with reference to FIG. 1.

Figure 5:
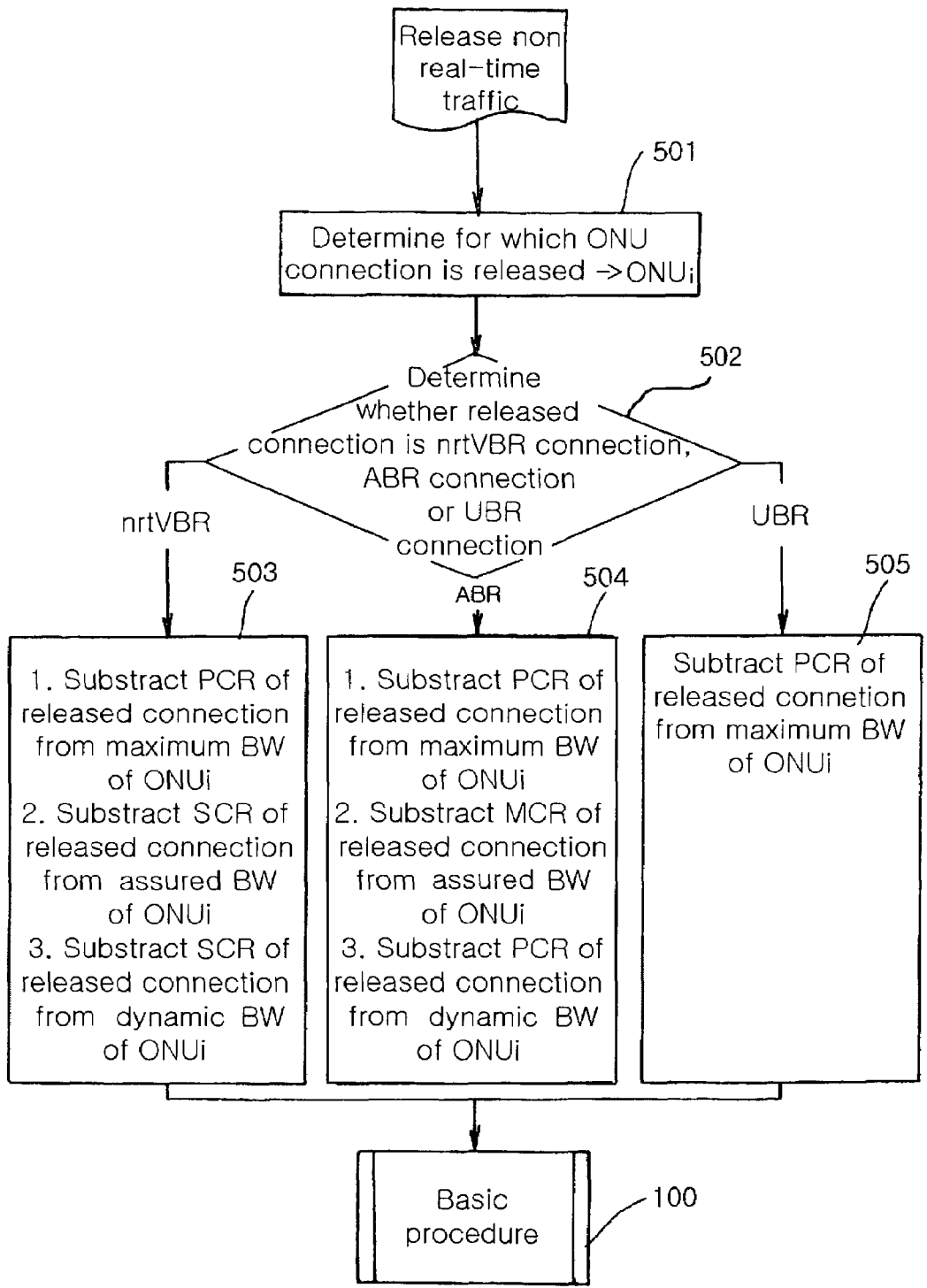
FIG. 5 is a flow chart illustrating a procedure of performing a pre-processing necessary before the dynamic bandwidth allocation according to the present invention, when an existing non real-time connection is released.

FIG. 5 is a flow chart illustrating a procedure of performing a pre-processing necessary before the dynamic bandwidth allocation, when an existing non real-time connection is released in the dynamic bandwidth allocation method according to the present invention.

First, it is determined with which ONU the non real-time connection release is associated (S501). An ONU associated with the non real-time connection release is called an ONUi.

Then, it is determined whether the released connection is a nrtVBR connection, ABR connection or UBR connection (S502). Traffic indicators for the released connection associated with the corresponding ONUi are updated in different manners. A more detailed description will be given of the traffic indicator update.

If it is determined at step 502 that the released connection is a nrtVBR connection, the traffic indicators for the released nrtVBR connection are updated in such a manner as to subtract a PCR of the released nrtVBR connection from a maximum BW of the ONUi and to subtract an SCR of the released nrtVBR connection from an assured BW and a dynamic BW of the ONUi (S503).

Alternatively, if it is determined at step 502 that the released connection is an ABR connection, the traffic indicators for the released ABR connection are updated in such a manner as to subtract the PCR from the maximum BW and to subtract a minimum cell rate (MCR) of the released ABR connection from the assured BW and dynamic BW (S504).

On the other hand, if it is determined at step 502 that the released connection is an UBR connection, the traffic indicators for the released UBR connection are updated in such a manner as to subtract the PCR from the maximum BW (S505).

After updating the traffic indicators for the released connection associated with the ONUi, the dynamic bandwidth allocation is performed (S100) in the same manner as shown in FIG. 1.

Figure 6:
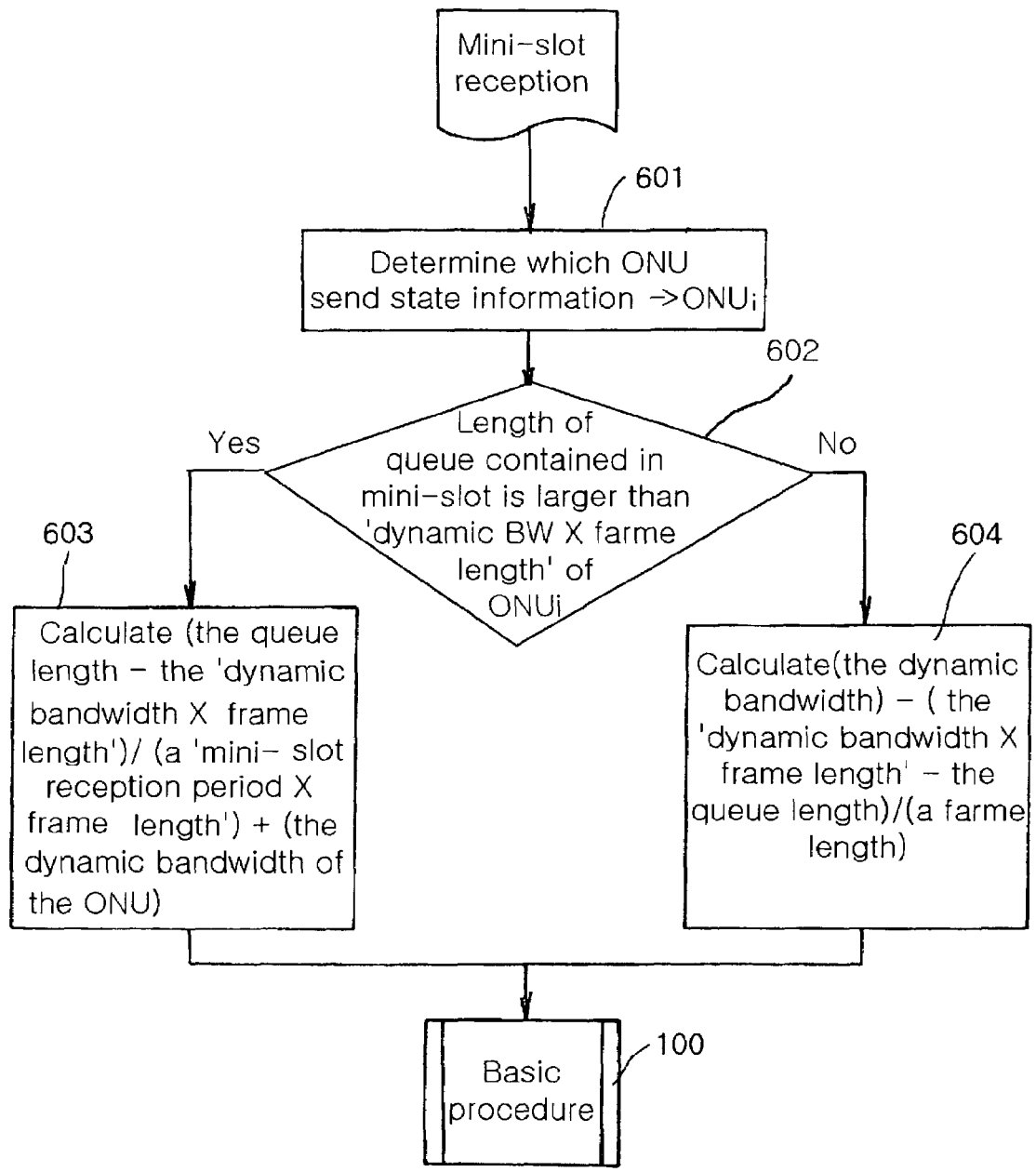
FIG. 6 is a flow chart illustrating a procedure of performing a pre-processing necessary before the dynamic bandwidth allocation according to the present invention, when state information is received from a certain ONU.

FIG. 6 is a flow chart illustrating a procedure of performing a pre-processing necessary before the dynamic bandwidth allocation, when an OLT receives state information from a certain ONU using a mini-slot in the dynamic bandwidth allocation method according to the present invention. First, it is determined from which ONU the state information contained in the mini-slot is transmitted (S601). An ONU sending the state information is called an ONUi. The mini-slot is sent from the ONUi to the OLT to notify it the state information of the ONUi.

Then, it is determined whether the length of a queue contained in the received mini-slot is larger than a value of 'dynamic BW×frame length' of the ONUi (S602)

If it is determined at step 602 that the queue length contained in the received mini-slot is larger than the value of the 'dynamic BW×frame length', the value of the 'dynamic BW×frame length' is subtracted from the queue length, and the result of the subtraction is divided by a value of 'mini-slot reception period×frame length'. Then, the division result is added to a dynamic bandwidth of the ONUi (S603).

Alternatively, if it is determined at step 602 that the queue length contained in the received mini-slot is not larger than the value of the 'dynamic BW×frame length', the queue length is subtracted from the value of the 'dynamic BW×frame length', and the result of the subtraction is divided by the frame length. Then, the division result is subtracted from the dynamic bandwidth of the ONUi (S604).

After this, the dynamic bandwidth allocation procedure of FIG. 1 is performed (S100) in the same manner as described above with reference to FIG. 1.

As apparent from the above description, the present invention provides a method for dynamically allocating bandwidth in an ATM-PON. The dynamic bandwidth allocation method according to the present invention is advantageous in that the utilization efficiency of an upstream transmission channel is maximized, and efficient transmission is possible. Further, the dynamic bandwidth allocation method according to the present invention can provide various multimedia services and allow a number of users to effectively and economically share and use expensive optical resources, resulting in an enhancement in an economic effect.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for dynamically allocating bandwidth in an asynchronous transmission mode—passive optical network (ATM-PON) for data exchange between an optical line termination (OLT) and an optical network unit (ONU) group including a plurality of ONUs, the method comprising the steps of:
    a) setting fixed bandwidth, effective bandwidth, assured bandwidth, maximum bandwidth and dynamic bandwidth as traffic indicators of the connections established to each of the ONUs;
    b) comparing a sum of fixed bandwidths of all the ONUs with an available link capacity;
    c) allocating bandwidth to each of the ONUs proportionally to the effective bandwidths of the corresponding ONUs, if the sum of the fixed bandwidths of all the ONUs is larger than the available link capacity;
    d) allocating bandwidth to the all ONUs by the fixed bandwidths and comparing a sum of maximum bandwidths of all the ONUs with the available link capacity, if the sum of the fixed bandwidths of all the ONUs is not larger than the available link capacity; and
    e) additionally allocating remaining bandwidth to the ONUs proportionally to the dynamic bandwidths, if the sum of the maximum bandwidths is larger than the available link capacity, and allocating bandwidth to each of the ONUs such that the entire bandwidths to be allocated to each of the ONUs is equal to the maximum bandwidths and equally allocating remaining bandwidth to the ONUs by the same amount, if the sum of the maximum bandwidths is not larger than the available link capacity.

2. The method according to claim 1, wherein, at the step a), the fixed bandwidth is set to a sum of peak cell rates (PCRs) of all real-time connections established to each of the ONUs; the effective bandwidth is set to a sum of peak cell rates (PCRs) of all constant bit rate (CBR) connections and sustainable cell rates (SCRs) of all real-time variable bit rate (rtVBR) connections, the CBR and rtVBR connections being established to each of the ONUs; the maximum bandwidth is set to a sum of PCRs of all connections established to each of the ONUs; and the assured bandwidth is set to a sum of a sum of minimum cell rates (MCRs) of all available bit rate (ABR) connections and a sum of sustainable cell rates (SCRs) of all non real-time variable bit rate (nrtVBR) connections, the ABR and nrtVBR connections being established to each of the ONUs.

3. The method according to claim 1, wherein the step c) comprises the steps of:
    c-1) allocating bandwidth to the ONUs proportionally to the effective bandwidth;
    c-2) allocating bandwidth to the ONU as much as the fixed bandwidth, if bandwidth to be allocated to an ONU of the ONU group exceeds a fixed bandwidth set for the ONU;
    c-3) allocating bandwidth as much as a difference of the bandwidth to be allocated to the ONU and the fixed bandwidth to the ONUs proportionally to the effective bandwidth; and
    c-4) returning to the step c-1) if the entire bandwidth is not allocated.

4. The method according to claim 1, wherein the step e) comprises the steps of:
    e-1) additionally allocating bandwidth to the ONUs such that the entire bandwidth to be allocated to each of the ONUs is equal to the maximum bandwidth, if the sum of the maximum bandwidths is not larger than the available link capacity; and
    e-2) equally allocating bandwidth remaining after the additional allocation to the ONUs by the same amount.

5. The method according to claim 1, wherein the step e) further comprises the steps of:
    e-1) additionally allocating bandwidth remaining after the bandwidth allocation at the step d) to the ONUs proportionally to the dynamic bandwidth, if the sum of the maximum bandwidths is larger than the available link capacity;
    e-2) allocating bandwidth to an ONU of the ONU group as much as the maximum bandwidth thereof if the entire bandwidth to be allocated to the ONU exceeds the maximum bandwidth thereof;
    e-3) equally allocating bandwidth remaining after the bandwidth allocation to the ONU to the other ONUs by the same amount,
    whereby, the step b) and c) is repeatedly performed until the entire bandwidth is allocated to all the ONUs.

6. The method according to claim 1, further comprising the step of:
    f) updating the fixed bandwidths, the effective bandwidths, the maximum bandwidths and the assured bandwidths of an ONU of the ONU group when a new real-time connection is established to the ONU or when an existing real-time connection is released from the ONU, and updating the dynamic bandwidth of the ONU under the condition that the dynamic bandwidth is initially set to the same value as the assured bandwidth when a new non real-time connection is established thereto or when an existing non real-time connection is released,
    whereby, after updating the traffic indicators at the step f), the steps b) to e) are performed.

7. The method according to claim 6, wherein the step f) comprises the steps of:
    f-1) determining to which ONU the real-time connection has been established, if the new real-time connection is established;
    f-2) determining whether the established real-time connection is a CBR connection or a rtVBR connection;
    f-3) updating the fixed bandwidth, the effective bandwidth and the maximum bandwidth of the corresponding ONU by adding a PCR of the new established real-time connection to each of them, if the established real-time connection is the CBR connection; and
    f-4) updating the fixed bandwidth, the effective bandwidth and the maximum bandwidth of the corresponding ONU by adding the PCR to each of the fixed and maximum bandwidths and by adding an SCR to the effective bandwidth of the new established real-time connection, if the established real-time connection is the rtVBR connection.

8. The method according to claim 6, wherein, if the existing new real-time connection is released at the step f), the step f) comprises the steps of:
   f-1) determining from which ONU the real-time connection has been released;
   f-2) determining whether the released real-time connection is a CBR connection or a rtVBR connection;
   f-3) subtracting a PCR of the released real-time connection from each of the fixed bandwidths, the effective bandwidths and the maximum bandwidths of the corresponding ONU, if the released real-time connection is the CBR connection; and
   f-4) subtracting the PCR from each of the fixed and maximum bandwidths of the corresponding ONU and subtracting an SCR of the released real-time connection from the effective bandwidth of the ONU, if the released real-time connection is the rtVBR connection.

9. The method according to claim 6, wherein the step f) comprises the steps of:
   f-1) determining to which ONU the non real-time connection has been established, if the new non real-time connection is established;
   f-2) determining whether the established non real-time connection is a nrtVBR connection, an ABR connection or a unspecified bit rate (UBR) connection;
   f-3) adding a PCR of the non real-time connection to the maximum bandwidth of the corresponding ONU, adding an SCR of the non real-time connection to the assured bandwidth of the ONU and adding the SCR to the dynamic bandwidth of the ONU, if the established non real-time connection is the nrtVBR connection;
   f-4) adding a minimum cell rate (MCR) of the non real-time connection to the assured bandwidth and adding the MCR to the dynamic bandwidth, if the established non real-time connection is the ABR connection, adding the PCR to the maximum bandwidth; and
   f-5) adding the PCR to the maximum bandwidth, if the established non real-time connection is the UBR connectio.

10. The method according to claim 6, wherein the step f) comprises the steps of:
   f-1) determining from which ONU the non real-time connection has been released, if the existing non real-time connection is released;
   f-2) determining whether the released non real-time connection is a nrtVBR connection, an ABR connection or a UBR connection;
   f-3) subtracting a PCR of the non real-time connection from the maximum bandwidth of the corresponding ONU, subtracting an SCR of the non real-time connection from the assured bandwidth of the ONU and subtracting the SCR from the dynamic bandwidth of the ONU, if the released non real-time connection is the nrtVBR connection;
   f-4) subtracting the PCR from the maximum bandwidth, subtracting an MCR of the non real-time connection from the assured bandwidth and subtracting the MCR from the dynamic bandwidth, if the released non real-time connection is the ABR connection; and
   f-5) subtracting the PCR from the maximum bandwidth, if the released non real-time connection is the UBR connection.

11. The method according to claim 6, wherein the dynamic bandwidth is updated when the state information of each of the ONUs is received.

12. The method according to claim 6, wherein the step f) comprises the steps of:
   f-1) determining which ONU sends the state information, if a state information is received from any one of the ONUs using a mini-slot;
   f-2) comparing a length of a queue contained in the mini-slot with a value of 'dynamic bandwidth×frame length' of the corresponding ONU;
   f-3) calculating (the queue length−the 'dynamic bandwidth×frame length')/(a 'mini-slot reception period×frame length')+(the dynamic bandwidth of the ONU), if the queue length is larger than the value of 'dynamic bandwidth×frame length'; and
   f-4) calculating (the dynamic bandwidth−(the 'dynamic bandwidth×frame length'−the queue length))/(a frame length), if the queue length is not larger than the value of 'dynamic bandwidth×frame length'.

13. A computer-readable recording medium which stores a program therein in an ATM PON for data exchange between an OLT and an ONU group including a plurality of ONUs, the program executing the steps of:
   a) setting a fixed bandwidth, effective bandwidth, assured bandwidth, maximum bandwidth and dynamic bandwidth as traffic indicators of the connections established to each of the ONUs;
   b) comparing a sum of fixed bandwidths of all the ONUs with an available link capacity;
   c) allocating bandwidth to each of the ONUs proportionally to the effective bandwidths of the corresponding ONUs, if the sum of the fixed bandwidths of all the ONUs is larger than the available link capacity;
   d) allocating bandwidth to the all ONUs by the fixed bandwidths and comparing a sum of maximum bandwidths of all the ONUS with the available link capacity, if the sum of the fixed bandwidths of all the ONUs is not larger than the available link capacity; and
   e) additionally allocating remaining bandwidth to the ONUs proportionally to the dynamic bandwidths, if the sum of the maximum bandwidths is larger than the available link capacity, and allocating bandwidth to each of the ONUs such that the entire bandwidths to be allocated to each of the ONUs is equal to the maximum bandwidths and equally allocating remaining bandwidth to the ONUs by the same amount, if the sum of the maximum bandwidths is not larger than the available link capacity.

* * * * *